F. C. WARNE.
CULTIVATOR.
APPLICATION FILED FEB. 21, 1914.
1,110,471.
Patented Sept. 15, 1914.
4 SHEETS—SHEET 4.
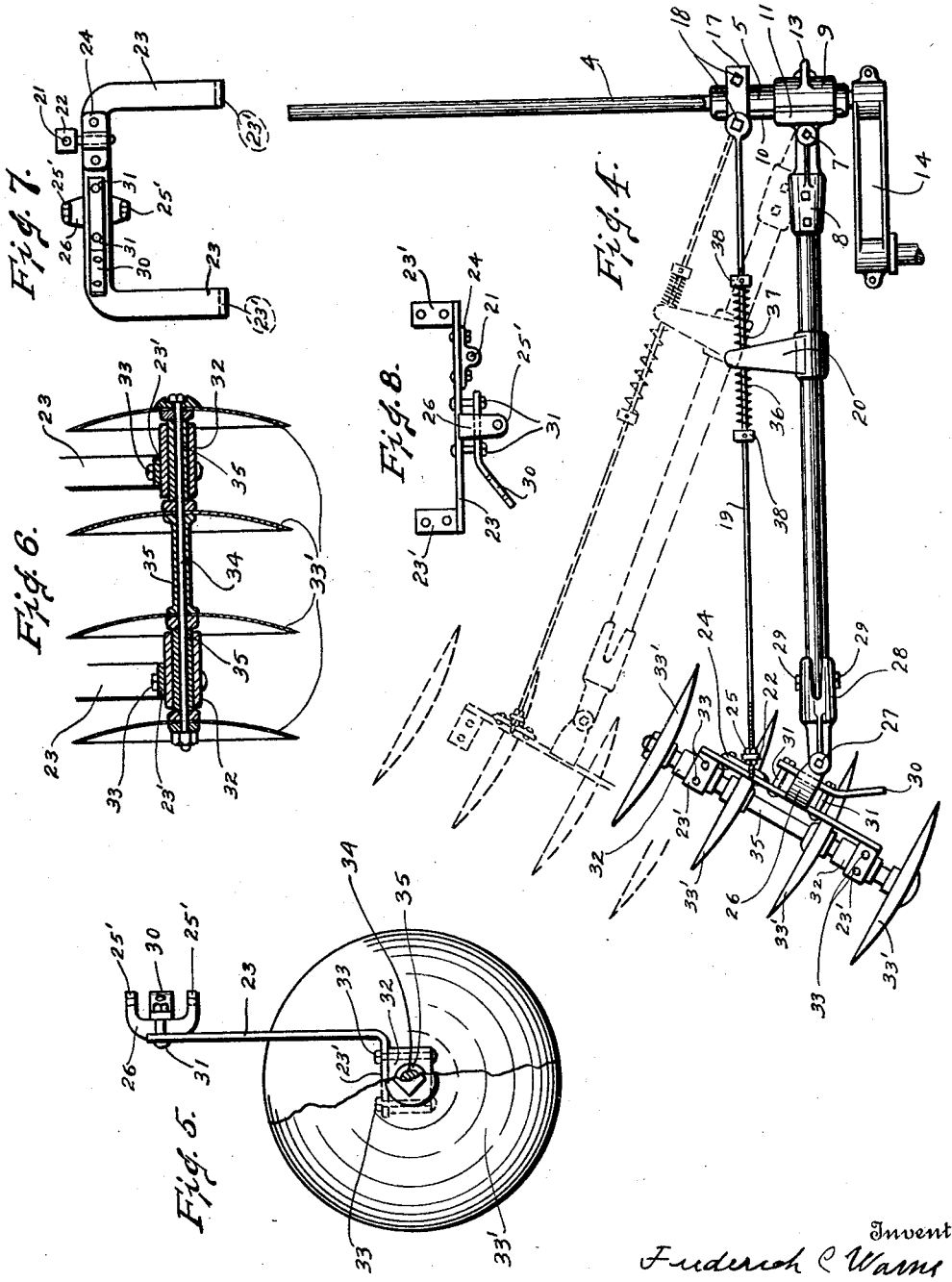

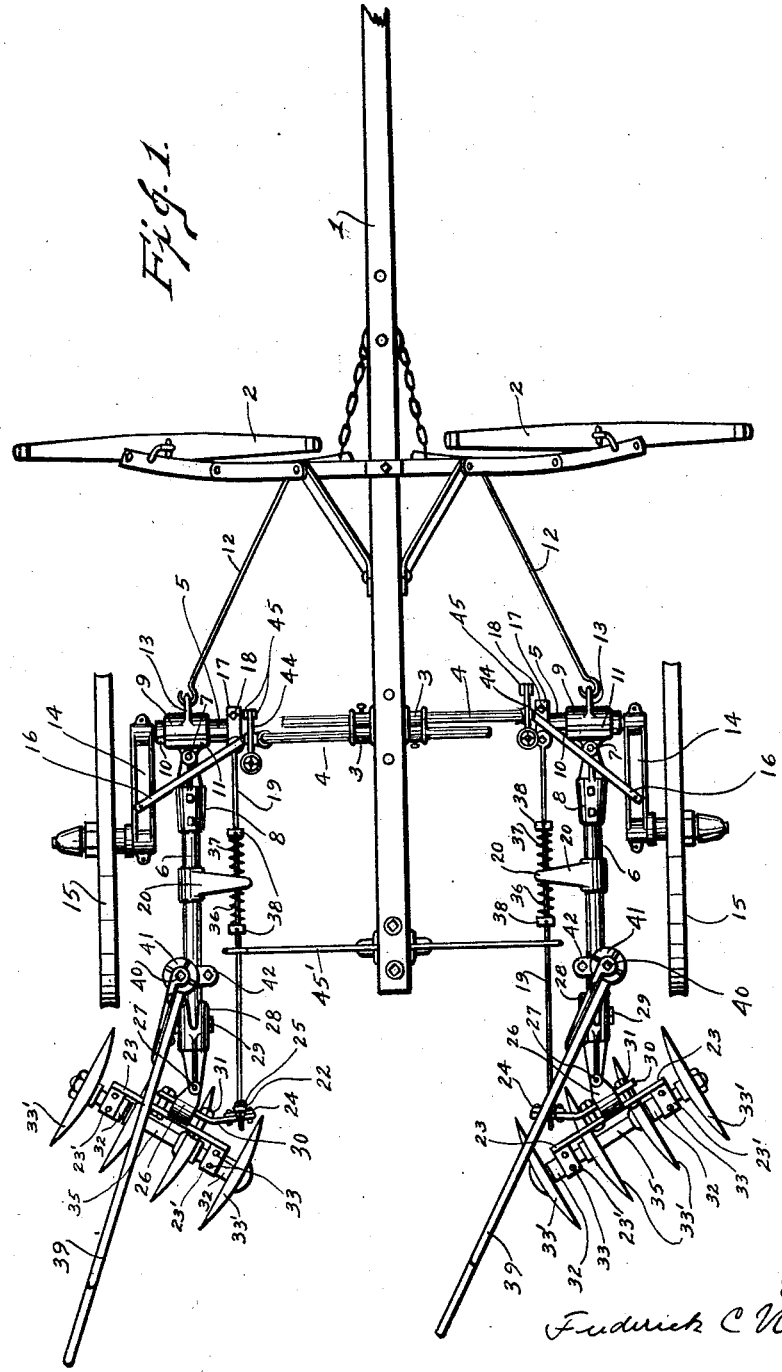

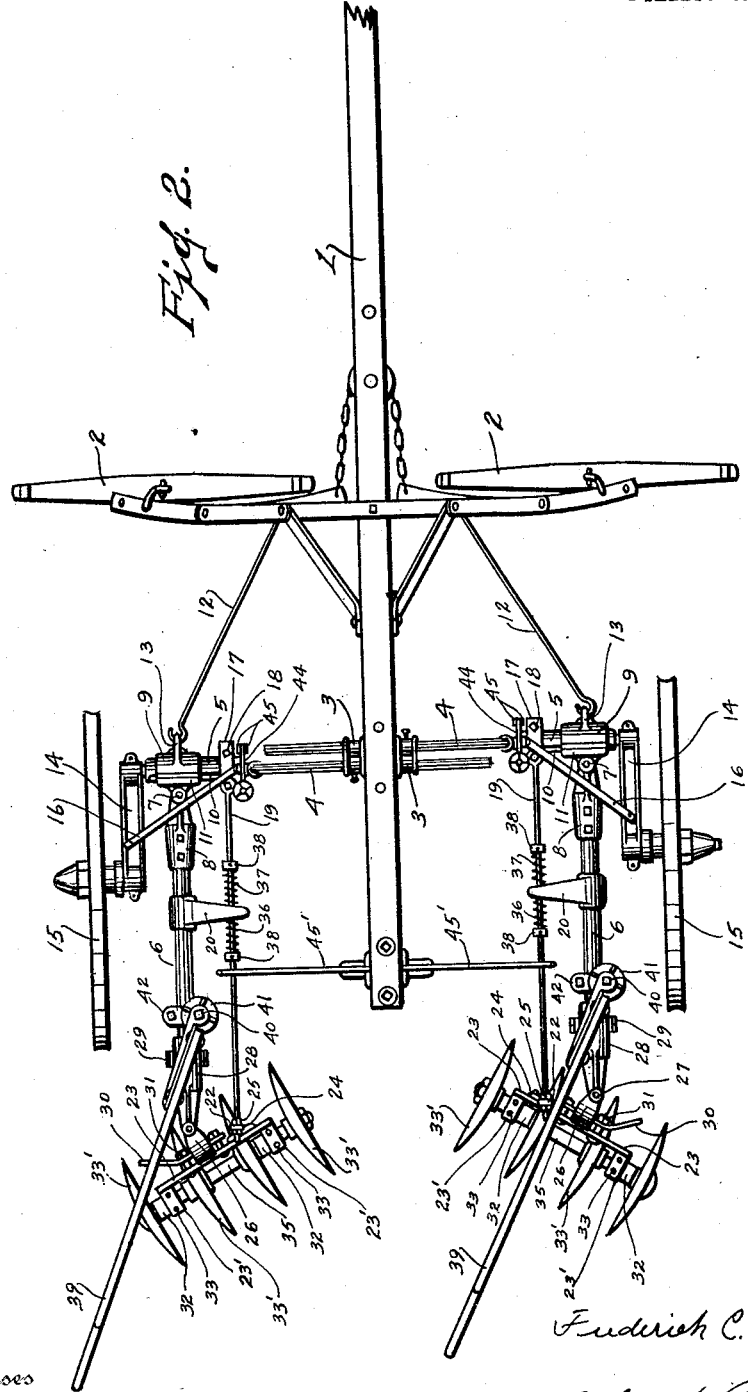

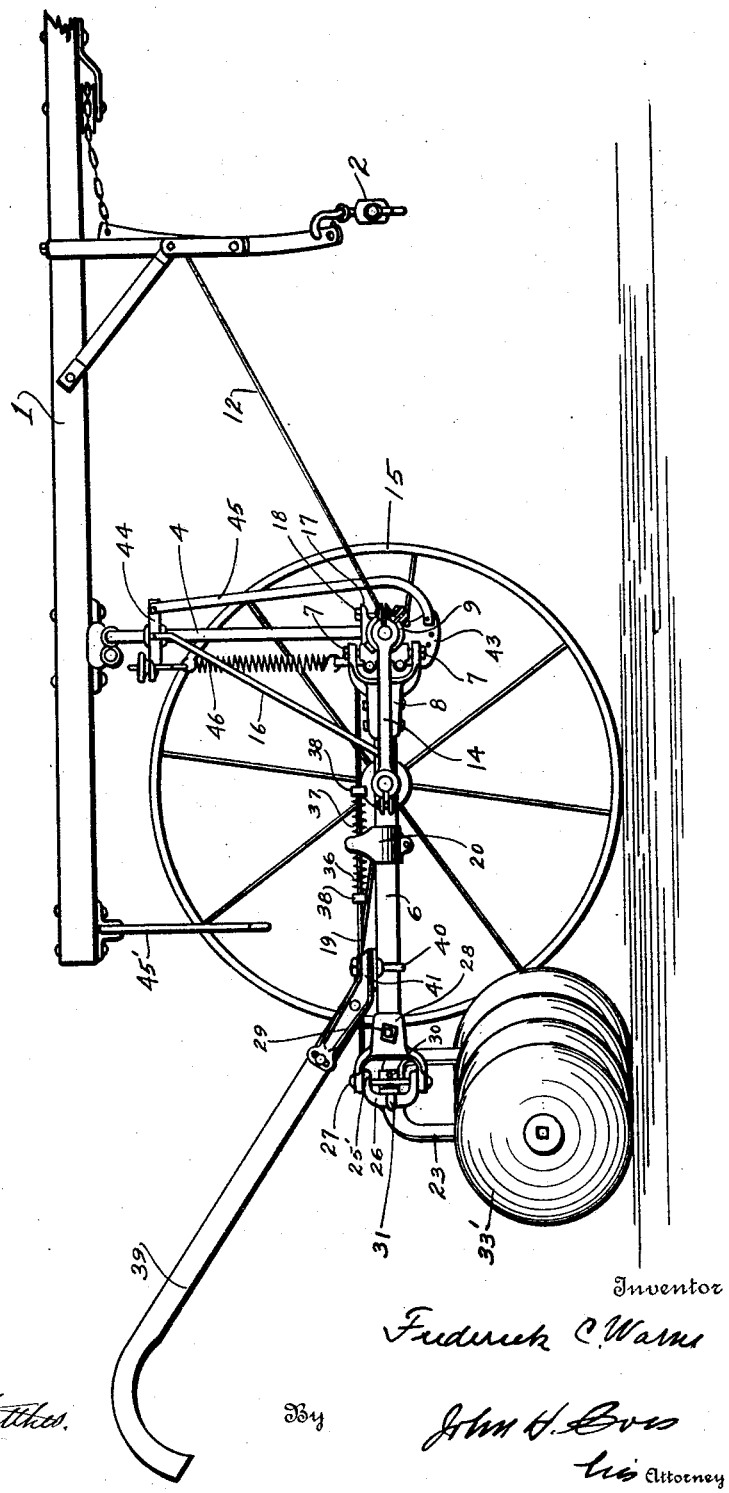

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

CULTIVATOR.

1,110,471. Specification of Letters Patent. Patented Sept. 15, 1914.

Application filed February 21, 1914. Serial No. 820,135.

*To all whom it may concern:*

Be it known that I, FREDERICK C. WARNE, a citizen of the United States of America, residing at Mansfield, in the county of Richland and State of Ohio, have invented certain new and useful Improvements in Cultivators, of which the following is a specification.

This invention relates to certain new and useful improvements in cultivators, and perhaps more particularly to that class of cultivators commonly termed "walking cultivators."

The primary object of the invention is to provide means of attachment for the gang disk beams whereby the latter may reciprocate vertically as well as horizontally, which stated movements may occur independently or simultaneously, and to also provide means of attachment for the gangs to the beams so that the gangs may have horizontal pivotal movement relative to and independent of the beams.

Further the invention has for its object the provision of means which maintain the angular relationship of the disks to the ground constant.

Still further the invention aims to provide means for varying the angle of the gang relative to the line of travel of the cultivator to thus enable more or less soil to be thrown either inwardly toward the plants in the case of good soil or outwardly away from the plants in case of weedy soil.

The invention also aims to provide a cultivator in which the gangs are movable independently of each other and counteract the pressure of the soil against the disks so as to assist the operator in holding the gangs in their proper places.

In the drawings: Figure 1 is a top plan view of the invention, in which the disk gangs are illustrated in out-throw position; Fig. 2 is a similar view showing the disk gangs in in-throw position; Fig. 3 is a side elevation of Fig. 2, one of the traction wheels being removed; Fig. 4 is a fragmentary top plan view in which the one gang illustrated is in in-throw position and is also shown in dotted line position to illustrate the action of the springs; Fig. 5 is an end elevation partly broken away and in section of one of the disk gangs; Fig. 6 is a longitudinal sectional view of one of the disk gangs; Fig. 7 is a front elevation of one of the yokes of the gangs; Fig. 8 is a top plan view of Fig. 7.

The invention includes a central tongue 1 to which the usual draft appliance 2 is attached. Brackets 3 are attached to the tongue 1 and adjustably support a pair of yokes, sleeves 5, being journaled upon the lower ends of the yokes. Beams 6 are in pivotal connection with the sleeves 5 by means of couplings 8 which latter are pivoted at 7 to couplings 9, the sleeves 5 having keys 10 which are slidable in key-ways 11 formed in the couplings 9. Rods 12 are connected to the couplings 9 and to the draft appliance 2 for which purpose eyes 13 are provided on the couplings 9 to engage with the rods 12. Arms 14 are secured at one end to the lower ends of the yokes 4 and at their outer ends are formed to provide bearings for the stub axles of the wheels 15, braces 16 being connected to the arms 14 and to the yokes 4 in order to sustain the arms 14 in rigid relation to the yokes. Couplings 17 are secured to the inner ends of the sleeves 5 by means of U-bolts 18, bars 19 being pivoted at one end to the couplings 17 and being slidably passed through arms 20 that are rigidly secured to the beams 6. The outer or rear ends of the bars 19 are threaded and extend through the eyes 21 formed in the heads of pivot pins 22 which latter are pivotally connected to the gang yokes 23 by means of clips 24 as depicted in Fig. 7, nuts 25 being engaged with said threaded ends of the bars 19 to secure the latter to the pivot pins 22.

The yokes 23 are provided with brackets 26 which are rigidly secured thereto, which brackets have spaced forwardly projecting perforated ears 25' through the perforations of which ears pivot bolts 27 are passed. The pivot bolts 27 are also connected to couplings 28 the latter being split and engaged over the outer ends of the beams 6. The couplings 28 are adjustably secured to the beams by bolts 29, in order that the pivot bolts 27 may be given varying angular relationship to the surface of the ground to thereby provide for varying corresponding angular disposition of the gang disks relative to the surface of the ground. Each yoke has an arm 30 secured thereto by bolts 31 to which the bar 19 is pivotally and adjustably attached for the out throw position as shown in Fig. 1. For the in throw position the bar 19 is pivotally and adjustably attached to one end of the yoke 23 as shown in Fig. 2.

The bracket 24 which carries the pivot pin 22 is attached to the end of the bar 30 for out throw position as shown in Fig. 1, but is removed and attached to the end of the yoke 23 for in throw position as shown in Figs. 2 and 7. The lower yoke ends are turned outwardly at 23′ and have bearing boxes 32 secured thereto by bolts 33 as shown in Fig. 5.

The disks 33′ are mounted on a shaft 34 and are held in spaced relation by sleeves 35, two of which latter are journaled in the bearing boxes 32. A pair of coil springs 36 and 37 encircle each of the bars 19 and abut opposite sides of the arms 20 at their inner ends and collars 38 at their respective outer ends, the collars 38 being adjustable on the bar 19. Each gang has an operating handle 39 which handles are adjustably secured to the beams 6 by means of bolts 40 which pass through enlarged heads 41 formed on the handles and through similar heads borne by clips 42 which latter are rigidly affixed to the beams 6. The contacting faces of the heads are preferably serrated to increase the holding efficiency of the parts upon adjustment and tightening of the bolt 40. The beam lifting mechanism (shown in Fig. 3) forms the subject matter of an application bearing Serial Number 723,411, filed October 1, 1912 and is fully described in said application.

A hanger 45′ is secured to the tongue 1, and has hooked ends which when the beams 6 are moved up into engagement therewith, sustains same in raised position out of engagement with the ground.

Attention is called to the fact that the springs 36 and 37 are set to abut against the arm 20 under compression to assist the operator in yieldingly maintaining the beams and gangs in a predetermined lateral position, and to counteract the action of the soil on the disks.

What is claimed is:—

1. In a cultivator, a beam, means to pivotally support the beam, a yoke, a gang of disks connected to the yoke, means to pivotally connect said yoke to the beam, an arm on the beam, a bar pivotally connected to the beam support and passed through said arm, spring means between the arm and bar to tension the latter, and means to pivotally connect the bar to the yoke.

2. In a cultivator, a beam, means to pivotally support the beam, a yoke, a gang of disks connected to the yoke, means to pivotally connect said yoke to the beam, an arm on the beam, a bar pivotally connected to the beam support and passed through said arm, a pair of springs on the bar engaging opposite sides of the arm whereby the gang will be tensioned when set either for an in or an out throw, and means to pivotally connect the bar to the yoke.

3. In a cultivator, a beam, means to pivotally support the beam, a yoke, a gang of disks connected to the yoke, means to pivotally and reversibly connect said yoke to the beam, an arm on the beam, a bar pivotally connected to the beam support and passed through said arm, a pair of springs on the bar engaging opposite sides of the arm, means to pivotally connect the bar to the yoke to provide for an in throw of the gang, and other means connected to the yoke to provide a pivotal connection with said bar when the gang is adjusted for an out throw.

4. In a cultivator, a beam, means to pivotally support the beam, a yoke, means to pivotally and reversibly connect the yoke to the beam, a gang of disks connected to the yoke, a rod pivoted to the beam supporting means, a pin in connection with said rod rotatably supported by the yoke, an arm connected to the yoke and having an offset portion to enable said pin to be secured thereto when said yoke is reversed, and spring means to tension said rod.

5. In a cultivator, a beam, means to pivotally support the beam, a yoke, means to pivotally and reversibly connect the yoke to the beam, a gang of disks connected to the yoke, a rod pivoted to the beam supporting means, a pin in connection with said rod rotatably supported by the yoke, an arm connected to the yoke and having an offset portion to enable said pin to be secured thereto when said yoke is reversed, a rigid arm on the beam in slidable connection with the rod, and a pair of coil springs on the rod having their outer ends connected to the rod and having their inner ends abutting said rigid arm on opposite sides thereof.

6. In a cultivator, a beam, a gang of disks connected to the beam and means to support the beam to enable combined or independent horizontal and vertical movement, connecting means between the gang of disks and beam support and means connected to said beam and said connecting means to counteract the side thrust of the soil on the disks with reference to the line of draft.

7. In a cultivator, a beam, means to support said beam to permit of horizontal movement thereof, an earth working device and means of connecting it to the beam to permit of horizontal, pivotal movement, and means connecting the beam and earth working device, said latter means having yielding means to resist movement of the beam about its pivotal connection with the beam support.

8. In a cultivator, a beam, an earth working device and means of connecting it to the beam to permit of horizontal movement and means to support the beam to enable combined or independent horizontal and vertical movement, connecting means between the earth working device and beam support, and means connected to said beam and said means to counteract the side thrust of the soil on the earth working device with reference to the line of draft.

In testimony whereof I affix my signature in presence of two witnesses.

FREDERICK C. WARNE.

Witnesses:
 JOHN H. COSS,
 LELA RITCHIE,

Copies of this patent may be obtained for five cents each, by addressing the "Commissioner of Patents, Washington, D. C."